United States Patent
Hwang et al.

(10) Patent No.: US 11,338,551 B2
(45) Date of Patent: May 24, 2022

(54) HOT-DIP GALVANIZED STEEL SHEET HAVING EXCELLENT LOW-TEMPERATURE ADHESION AND WORKABILITY

(71) Applicant: POSCO, Pohang-si (KR)

(72) Inventors: Hyeon-Seok Hwang, Gwangyang-si (KR); Sang-Heon Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 16/957,222

(22) PCT Filed: Dec. 20, 2018

(86) PCT No.: PCT/KR2018/016378
§ 371 (c)(1),
(2) Date: Jun. 23, 2020

(87) PCT Pub. No.: WO2019/125020
PCT Pub. Date: Jun. 27, 2019

(65) Prior Publication Data
US 2020/0391480 A1    Dec. 17, 2020

(30) Foreign Application Priority Data
Dec. 24, 2017    (KR) .................. 10-2017-0178952

(51) Int. Cl.
*B32B 15/01*        (2006.01)
*C22C 18/00*        (2006.01)
(Continued)

(52) U.S. Cl.
CPC ............ *B32B 15/013* (2013.01); *B32B 15/01* (2013.01); *B32B 15/012* (2013.01); *B32B 15/04* (2013.01);
(Continued)

(58) Field of Classification Search
CPC ..... B32B 15/013; B32B 15/012; B32B 15/01; B32B 15/04; B32B 15/043; B32B 15/18;
(Continued)

(56) References Cited

U.S. PATENT DOCUMENTS

2008/0206592 A1    8/2008  Kim et al.
2013/0177780 A1    7/2013  Park et al.
(Continued)

FOREIGN PATENT DOCUMENTS

CN    104099550        10/2014
CN    104975226 A      10/2015
(Continued)

OTHER PUBLICATIONS

Machine Translation, Kim et al., KR 101786377 B1, Oct. 2017. (Year: 2017).*

(Continued)

*Primary Examiner* — Michael E. La Villa
(74) *Attorney, Agent, or Firm* — Cantor Colburn LLP

(57) ABSTRACT

Provided is a hot-dip galvanized steel sheet having excellent low-temperature adhesion and workability, and a manufacturing method therefor, the hot-dip galvanized steel sheet comprising: an inhibition layer formed on a base steel sheet and comprising an Fe—Al-based intermetallic alloy phase; a hot-dip galvanized layer formed on the inhibition layer; and an Al—Mn-based alloy phase discontinuously formed between the inhibition layer and the hot-dip galvanized layer.

8 Claims, 2 Drawing Sheets

[COMPARATIVE EXAMPLE 2]

[INVENTIVE EXAMPLE 2]

[COMPARATIVE EXAMPLE 7]

(51) Int. Cl.
| | |
|---|---|
| *C23C 2/06* | (2006.01) |
| *C23C 2/26* | (2006.01) |
| *C23C 2/40* | (2006.01) |
| *C22C 18/04* | (2006.01) |
| *C23C 28/02* | (2006.01) |
| *C23C 30/00* | (2006.01) |
| *B32B 15/04* | (2006.01) |
| *C23C 2/04* | (2006.01) |
| *B32B 15/18* | (2006.01) |
| *C23C 2/28* | (2006.01) |
| *C23C 2/02* | (2006.01) |

(52) U.S. Cl.
CPC ............ *B32B 15/043* (2013.01); *B32B 15/18* (2013.01); *C22C 18/00* (2013.01); *C22C 18/04* (2013.01); *C23C 2/02* (2013.01); *C23C 2/04* (2013.01); *C23C 2/06* (2013.01); *C23C 2/26* (2013.01); *C23C 2/28* (2013.01); *C23C 2/40* (2013.01); *C23C 28/021* (2013.01); *C23C 28/023* (2013.01); *C23C 28/025* (2013.01); *C23C 30/00* (2013.01); *C23C 30/005* (2013.01); *Y10T 428/12757* (2015.01); *Y10T 428/12799* (2015.01); *Y10T 428/12861* (2015.01); *Y10T 428/12951* (2015.01); *Y10T 428/12958* (2015.01); *Y10T 428/12972* (2015.01); *Y10T 428/12979* (2015.01); *Y10T 428/2495* (2015.01); *Y10T 428/24959* (2015.01); *Y10T 428/24967* (2015.01); *Y10T 428/24983* (2015.01); *Y10T 428/26* (2015.01); *Y10T 428/263* (2015.01); *Y10T 428/264* (2015.01); *Y10T 428/265* (2015.01)

(58) Field of Classification Search
CPC ......... C22C 18/04; C22C 18/00; C23C 30/00; C23C 30/005; C23C 28/021; C23C 28/023; C23C 28/025; C23C 2/06; C23C 2/026; C23C 2/40; C23C 2/04; C23C 2/26; C23C 2/28; C23C 2/02; Y10T 428/12757; Y10T 428/12799; Y10T 428/12861; Y10T 428/12951; Y10T 428/12958; Y10T 428/12972; Y10T 428/12979; Y10T 428/2495; Y10T 428/24959; Y10T 428/24967; Y10T 428/24983; Y10T 428/26; Y10T 428/263; Y10T 428/264; Y10T 428/265

See application file for complete search history.

(56) References Cited

U.S. PATENT DOCUMENTS

| | | |
|---|---|---|
| 2014/0234657 A1 | 8/2014 | Azuma et al. |
| 2014/0349133 A1 | 11/2014 | Lee et al. |
| 2015/0337408 A1 | 11/2015 | Schulz et al. |
| 2018/0363118 A1 | 12/2018 | Kim |
| 2019/0194792 A1 | 6/2019 | Kim et al. |

FOREIGN PATENT DOCUMENTS

| | | |
|---|---|---|
| CN | 105369135 A | 3/2016 |
| CN | 105908089 | 8/2016 |
| EP | 2940177 | 11/2015 |
| EP | 3476968 | 5/2019 |
| KR | 100742832 | 7/2007 |
| KR | 20090070509 | 7/2009 |
| KR | 1020120075260 A | 7/2012 |
| KR | 20130026122 | 3/2013 |
| KR | 101280719 | 7/2013 |
| KR | 20130073421 | 7/2013 |
| KR | 20140068122 | 6/2014 |
| KR | 20150074882 | 7/2015 |
| KR | 101630991 | 6/2016 |
| KR | 101726090 | 4/2017 |
| KR | 101786377 | 10/2017 |
| KR | 20190076773 | 7/2019 |
| WO | 2009084793 | 7/2009 |
| WO | 2017111484 | 6/2017 |

OTHER PUBLICATIONS

European Search Report—European Application No. 18891506.0 dated Dec. 17, 2020.
Jianhua, et al. Analysis of Morphology and Growth Kinetics of Zn—Mn and Zn-0.2wt.%Al—Mn Hot-Dip Galvanizing Coatings, Advanced Materials Research-Materials Processing Technology, vols. 291-294, Jul. 2011, pp. 233-236.
International Search Report—PCT/KR2018/016378 dated Apr. 1, 2019.

* cited by examiner

… (Reference 1) Korean Laid-Open Patent Publication No. 2013-0026122

(Reference 2) Korean Registered Patent Publication No. 0742832

HOT-DIP GALVANIZED STEEL SHEET HAVING EXCELLENT LOW-TEMPERATURE ADHESION AND WORKABILITY

TECHNICAL FIELD

The present invention relates to a hot-dip galvanized steel sheet used as a steel sheet of an electronic appliance, a vehicle, and the like, and a method of manufacturing the same, and more specifically, a hot-dip galvanized steel sheet having excellent low-temperature adhesion and workability, and a method of manufacturing the same.

BACKGROUND ART

A hot-dip galvanized steel sheet is a product obtained by coating a steel sheet with metal zinc, and is a steel sheet having improved corrosion resistance by a method of sacrificing zinc. Such a hot-dip galvanized steel sheet has been widely used for a steel sheet for an electronic appliance and a vehicle.

As for a steel material for a vehicle, to intensify impact performance or to replace welding, an adhesive for a structure has been increasingly used for connecting members of a vehicle.

In the case in which two members formed using a hot-dip galvanized steel sheet are connected to each other using an adhesive (sealer), as for a general galvanized layer, low temperature adhesion embrittlement may occur in the galvanized layer when impact is applied at low temperature. When a member is used in the northern hemisphere, where the winter is relatively long, such a phenomenon may cause a serious problem in stability when the member undergoes a collision.

Also, a hot-dip galvanized steel sheet may have deteriorated galling properties, a phenomenon in which a galvanized layer is detached from a base iron and is attached to a die in press forming. When a die process operation is continuously performed using such a steel sheet, a defect such as scratches, or the likes, may occur and a product defect may increase, which may degrade productivity of operations and quality.

To address the problem of low temperature adhesion, a technique of increasing an average size of grain of a galvanized layer has been developed. However, as a size of a grain increases, image clarity and a surface exterior may be deteriorated, which may be a problem.

Meanwhile, as a method for improving galling properties, there may be a technique of adjusting surface roughness of a plating layer, a technique of lubricant-coating a surface of a plating layer (reference 1), a technique of refining grains of a plating layer (reference 2), and the like. The refinement of grains of a plating layer is a method of forcibly cooling the plating layer by spraying liquid particles on the plating layer, and by using the method, a surface may be beautified and galling properties may improve. However, operation of a facility to spray a liquid onto a plating port may be complex and a surface defect of a plating steel sheet may occur due to liquid particles, which may be disadvantageous. Also, a (0001) surface orientation may increase due to the rapid cooling such that low-temperature adhesion embrittlement may further be deteriorated.

DISCLOSURE

Technical Problem

A preferable aspect of the present invention is to provide a hot-dip galvanized steel sheet having excellent low-temperature adhesion and workability.

Another preferable aspect of the present invention is to provide a method of manufacturing a hot-dip galvanized steel sheet having excellent low-temperature adhesion and workability.

Technical Solution

A hot-dip galvanized steel sheet having excellent low-temperature adhesion and workability according to an aspect of the present invention may include an inhibition layer including an Fe—Al based intermetallic alloy phase formed on a base steel sheet; a hot-dip galvanized layer formed on the inhibition layer; and an Al—Mn based alloy phase discontinuously formed between the inhibition layer and the hot-dip galvanized layer.

An area ratio of the Al—Mn based alloy phase may be 50% or less (excluding 0%) of a surface of the inhibition layer.

An area ratio of the Al—Mn based alloy phase may be 20-40% of a surface of the inhibition layer.

Hardness of the hot-dip galvanized layer may be 85 Hv or higher.

A thickness of the inhibition layer may be 1 µm or less.

A thickness of the hot-dip galvanized layer may be 2-60 µm.

A method of manufacturing a hot-dip galvanized steel sheet having excellent low-temperature adhesion and workability according to an aspect of the present invention may include preparing a base steel sheet; hot-dip galvanizing the base steel sheet by submerging the base steel sheet in a hot-dip galvanizing bath having a temperature of 440-470° C. and including 0.1-0.3 wt % of Al and 0.01-0.55 wt % of Mn; and cooling the hot-dip galvanized steel sheet at a cooling rate of −20° C./s or higher and less than −45° C./s.

Advantageous Effects

According to a preferable aspect of the present invention, as a zinc growth direction (orientation) of a galvanized layer is irregularly arranged, low-temperature adhesion embrittlement may decrease, and hardness of a galvanized layer may improve such that a hot-dip galvanized steel sheet having excellent galling properties may be provided.

BEST MODE FOR INVENTION

Figure 1:
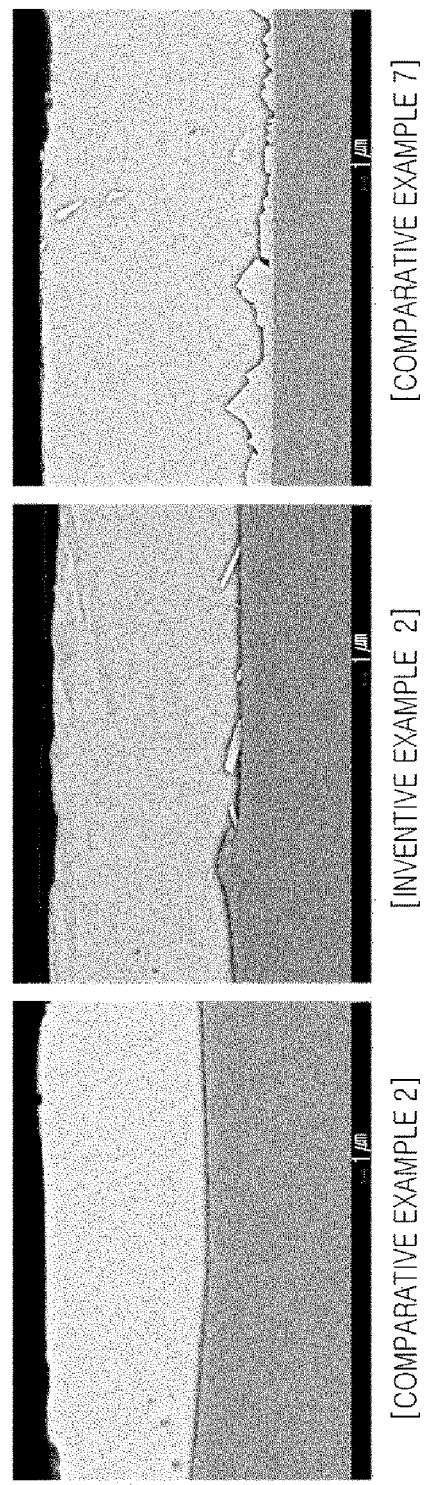
FIG. 1 is an image of a cross-sectional surface of a plating steel sheet, taken in a thickness direction with respect to inventive example 2 and comparative examples 2 and 7 of an embodiment.

The present invention relates to a hot-dip galvanized steel sheet having excellent low-temperature adhesion and workability, and a method of manufacturing the same, and in the description below, preferable embodiments of the present invention will be described. The embodiments of the present invention may be modified to various forms, and it should be understood that the scope of the present invention is not limited to the embodiments described below. The embodiments are provided to describe the present invention in greater detail to a person having ordinary skill in the art to which the present invention belongs to.

In the description below, the present invention will be described.

The present invention provides a hot-dip galvanized steel sheet having excellent low-temperature adhesion and workability by, to adjust orientation of spangle, preventing zinc from being equally oriented to a (0001) surface while being solidified by forming an Al—Mn alloy phase between an inhibition layer and a galvanized layer such that low-temperature adhesion embrittlement may be addressed and hardness of a galvanized layer may improve, thereby improving workability, and a method of manufacturing the same.

Particularly, the present invention provides a hot-dip galvanized steel sheet having excellent adhesion and workability by adjusting a composition of a plating path and a speed of cooling a galvanized layer (a galvanized steel sheet), and a method of manufacturing the same.

First of all, a hot-dip galvanized steel sheet having excellent low-temperature adhesion and workability according to one preferable aspect of the present invention will be described.

The hot-dip galvanized steel sheet having excellent low-temperature adhesion and workability according to one preferable aspect of the present invention may include an inhibition layer including an Fe—Al based intermetallic alloy phase formed on a base steel sheet; a hot-dip galvanized layer formed on the inhibition layer; and an Al—Mn based alloy phase discontinuously formed between the inhibition layer and the hot-dip galvanized layer.

Base Steel Sheet

In the present invention, a type of the base steel sheet is not limited to any particular type as long as the base steel sheet is able to be used as a hot-dip galvanized steel sheet.

Inhibition Layer

The hot-dip galvanized steel sheet of the present invention may include an inhibition layer including an Fe—Al based intermetallic alloy phase formed on the base steel sheet. The inhibition layer (an aluminum iron alloy layer) may prevent zinc from being iron-zinc alloyed and may also improve adhesion between zinc and a base iron at a room temperature. Accordingly, when a surface of the inhibition layer is covered by an aluminum-manganese alloy phase by a certain ratio or higher, adhesion may be deteriorated at room temperature.

A thickness (a coating amount) of the inhibition layer may be varied depending on an insertion temperature of a steel sheet, an aluminum concentration of a plating path, a submerging time, and the like, but preferably, the thickness may be 1 μm (micrometer) or less with reference to a cross-sectional surface of a galvanized layer, and more preferably, the thickness may be 200 nm-600 nm. When the thickness is 200 nm or less, the alloying of Fe may not be sufficiently prevented, such that Zn—Fe alloying reaction may partially occur on an interfacial surface of the galvanized layer. When the thickness exceeds 1 μm, the inhibition layer, which is easily brittle, may be fractured in processing such that the galvanized layer may be peeled, or other problems may occur.

Hot-Dip Galvanized Layer

The hot-dip galvanized steel sheet of the present invention may include a hot-dip galvanized layer formed on the inhibition layer. Hardness of the hot-dip galvanized layer may be 85 Hv or higher.

A thickness (coating amount) of the hot-dip galvanized layer may be 2-60 μm (micrometers), and more preferably, the thickness may be 4-50 μm. When a thickness of the hot-dip galvanized layer is less than 2 μm, the amount of zinc may be too small to exhibit sufficient corrosion resistance. When a thickness of the hot-dip galvanized layer exceeds 60 μm, surface quality may be deteriorated due to limitation of an air knife for the coating amount of the galvanized layer, and it may be difficult to sufficiently obtain the effect of the galvanizing orientation obtained by an aluminum-manganese crystallized product obtained in the present invention.

Al—Mn Alloy Phase

The hot-dip galvanized steel sheet of the present invention may include an Al—Mn based alloy phase discontinuously formed between the inhibition layer and the hot-dip galvanized layer. The Al—Mn based alloy phase may be partially disposed on a grain boundary of the galvanized layer.

The Al—Mn based alloy phase may be formed on the inhibition layer to randomly orient a crystallization direction of the galvanized layer. The randomly oriented galvanized layer may increase resistance against embrittlement fracture at a low temperature (−40° C.) when embrittlement fracture mechanism mainly works such that plating adhesion may improve.

It may be preferable for the Al—Mn based alloy phase to be discontinuously formed right on the inhibition layer, and a preferable area ratio of the Al—Mn based alloy phase may be 50% or lower (excluding 0%) of a surface of the inhibition layer. When an area ratio of the Al—Mn based alloy phase exceeds 50% of a surface of the inhibition layer, the inhibition layer which may improve adhesion between the galvanized layer and the base iron may be cut off by the alloy phase such that plating adhesion at room temperature may be deteriorated. Also, when an area ratio of the Al—Mn based alloy phase is too low, an effect of orientation of the galvanized layer by the alloy phase may decrease such that improvement in low-temperature adhesion embrittlement may be low. A preferable area ratio of the Al—Mn based alloy phase may be 20-40% of a surface of the inhibition layer.

The Al—Mn based alloy phase may prevent embrittlement fracture at low temperature by randomly orienting a growth direction of the galvanized layer, and as the Al—Mn based alloy phase does not entirely cover the inhibition layer, adhesive force between the inhibition layer and the galvanized layer may be secured, and accordingly, excellent plating adhesion may be provided at room temperature and also low temperature.

In the description below, a method of manufacturing a hot-dip galvanized steel sheet having excellent low-temperature adhesion and workability according to a preferable aspect of the present invention will be described.

The method of manufacturing a hot-dip galvanized steel sheet having excellent low-temperature adhesion and workability according to an preferable aspect of the present invention may include preparing a base steel sheet; hot-dip galvanizing the base steel sheet by submerging the base steel sheet in a hot-dip galvanizing bath having a temperature of 440-470° C. and including 0.1-0.3 wt % of Al and 0.01-0.55 wt % of Mn; and cooling the hot-dip galvanized steel sheet at a cooling rate of −20° C./s or higher and less than −45° C./s.

Preparing Base Steel Sheet

In the present invention, a type of a base steel sheet is not limited to any particular type as long as the base steel sheet is able to be used as a hot-dip galvanized steel sheet. The preparing the base steel sheet is not limited to any particular method in the present invention, and the process may be performed using a generally used process.

In the example of the preparing the base steel sheet, the base steel sheet may be degreased and pickled to remove foreign objects on a surface or an oxide film. The steel sheet from a surface of which foreign objects are removed may be heated to 750° C.-850° C. at a temperature increase rate of 4-7° C./s at reducing atmosphere and may be maintained for 20 seconds or longer. The reducing atmosphere may be nitrogen atmosphere containing 5% or higher of hydrogen. A preferable maintaining time may be 20 seconds or longer, and when the time is shorter than that, recovery and recrystallization of the base steel sheet may not sufficiently occur such that a mechanical property defect and a deviation may occur, and an oxide layer of a surface may not be sufficiently reduced such that plating properties may be deteriorated.

Hot-Dip Galvanizing

The prepared base steel sheet may be hot-dip galvanized by submersing the base steel sheet in a hot-dip galvanizing bath having a temperature of 440-470° C. and including 0.1-0.3 wt % of Al and 0.01-0.55 wt % of Mn.

A hot-dip galvanized steel sheet may be manufactured through a continuous galvanizing line (CGL). For example, the hot-dip galvanized steel sheet may be manufactured through a process of submerging the base steel sheet, which has been reduced at reducing atmosphere including hydrogen while undergoing a recrystallization process in an annealing furnace of 750-850° C., in the hot-dip galvanizing bath of 440-470° C.

The base steel sheet may be submerged in the hot-dip galvanizing bath after being cooled to 450-500° C. (inserting temperature) before being inserted into the hot-dip galvanizing bath. When the inserting temperature is too low, the formation of the inhibition layer in the galvanized layer may degrade such that adhesion may be deteriorated. When the inserting temperature is too high, the formation of dross in the hot-dip galvanizing bath may be facilitated such that a surface defect may occur.

When the temperature of the hot-dip galvanizing bath is less than 440° C., manganese solubility in the hot-dip galvanizing bath may decrease such that there may be a concern that dross may occur. When the temperature exceeds 470° C., the amount of ash of zinc may increase such that there may be a concern that a galvanized surface quality defect may occur.

When a content of Al in the hot-dip galvanizing bath is too low, it may be difficult to form the inhibition layer, and when the content is too high, dross may be increasingly formed. Thus, it may be preferable to limit a content of Al in the hot-dip galvanizing bath to 0.1-0.3 wt %.

Mn in the hot-dip galvanizing bath may be added to adjust the formation of Al (aluminum)-Mn (manganese) alloy phase on the inhibition layer. When a content of Mn in the hot-dip galvanizing bath is too low, an Al—Mn alloy phase may not be sufficiently formed on the inhibition layer such that the expected effect may not be obtained. When the content is too high, the alloy phase may be excessively formed on the inhibition layer such that adhesive force between the inhibition layer and the hot-dip galvanized layer may decrease, and solid solution limitation may be exceeded, which may cause dross in the hot-dip galvanizing bath and surface quality may degrade.

Thus, it may be preferable to limit a content of Mn in the hot-dip galvanizing bath to 0.01-0.55 wt %.

When the base steel sheet is submerged in the hot-dip galvanizing bath, the inhibition layer including an Fe—Al based intermetallic alloy phase may be formed on the base steel sheet.

Cooling

The hot-dip galvanized steel sheet as above may be cooled at a cooling rate of −20° C./s or higher and less than −45° C./s.

A thickness (coating amount) of zinc attached to the steel sheet discharged from the hot-dip galvanizing bath may be adjusted using an air knife, and liquid zinc of the galvanized steel sheet of which the coating amount is adjusted may be solidified in a cooling zone, thereby manufacturing a hot-dip galvanized steel sheet. When the cooling rate is less than −20° C./s, the Al—Mn layer may not be formed on the inhibition layer and may be formed on a surface of the galvanized layer and in the galvanized layer, and there may be no effect in improvement of low-temperature adhesion. Meanwhile, when the cooling rate is 45° C./s or higher, by rapid cooling spangle may be refined, and driving force of growth of a (0002) surface may increase such that a direction of spangle may be preferentially grown in vertical orientation, which may deteriorate low-temperature adhesion.

Thus, it may be preferable to limit the cooling rate to −20° C./s or higher and less than −45° C./s.

The cooling rate may be adjusted by adjusting a flowing amount of air in the cooling zone. An unique flower pattern of zinc may be exhibited in the cooling zone as zinc is solidified, and the flower pattern may be referred to as spangle. The spangle may be a shape formed by strong development of a dendrite structure by significant growth of a grain, and the more the spangle develops, the more the deviation in thickness of a galvanized layer between grains may increase, such that a tendency to deteriorate galling properties may occur.

Also, as for a preferential growth direction of zinc in the solidifying process, most of grains may be aligned in one direction, in a direction in which the (0001) surface is parallel to the steel sheet. At room temperature and high temperature, as fracture mechanism of zinc, embrittlement, a grain boundary, ductile fracture, and the like, may work complexly, but at low temperature, when impact is applied, embrittlement fracture in which fracture is formed along the (0001) surface may work as a main mechanism. As a result, low-temperature adhesion embrittlement in which a galvanized layer is easily peeled from a base iron may occur.

In the present invention, when the base steel sheet is submerged in the hot-dip galvanizing bath, the inhibition layer including an Fe—Al based intermetallic alloy phase may be formed on the base steel sheet, the base steel sheet may be discharged from the hot-dip galvanizing bath and may be cooled such that zinc may be solidified, and accordingly, the hot-dip galvanized layer and the Al—Mn based alloy phase may be formed. The hot-dip galvanized layer may include 0.01-0.55 wt % of Mn, and Mn contained in the hot-dip galvanized layer may react with Al such that the Al—Mn based alloy phase may be formed between the inhibition layer and the hot-dip galvanized layer.

According to the preferable method of manufacturing the hot-dip galvanized steel sheet, the hot-dip galvanized steel sheet including the inhibition layer including an Fe—Al based intermetallic alloy phase formed on a base steel sheet, the hot-dip galvanized layer formed on the inhibition layer, and the Al—Mn based alloy phase discontinuously formed between the inhibition layer and the hot-dip galvanized layer may be manufactured. Hardness of the hot-dip galvanized layer may be 85 Hv or higher.

MODE FOR INVENTION

In the description below, the present invention will be described in greater detail through an embodiment.

Embodiment

A hot-dip galvanized steel sheet as below was manufactured through a continuous galvanizing line (CGL). A base steel sheet was degreased and pickled to remove foreign objects on a surface, was heated to 810° C. at a heating rate of 4° C./s at reducing atmosphere containing 5% of hydrogen and 95% of nitrogen, was maintained for 30 seconds, was cooled to 480° C. (inserting temperature), was hot-dip galvanized by being submerged in a hot-dip galvanizing bath having a temperature of 460° C., and including 0.2 wt % of Al and Mn in a content as in Table 1 below, was cooled to 400° C. at a cooling rate as in Table 1 below, and was air-cooled, thereby manufacturing the hot-dip galvanized steel sheet.

With respect to the hot-dip galvanized steel sheet manufactured as above, whether an Al—Mn alloy phase was formed and a content thereof, impact peel strength, whether a galvanized layer was peeled, and hardness and a friction coefficient of the galvanized layer were measured, and results thereof were listed in Table 1 below.

An area ratio (%) of the Al—Mn alloy phase was indicated by an area ratio of the alloy phase to a surface of an inhibition layer. The impact peel strength was to examine low-temperature adhesion, and was measured through an impact peel test at −40° C. The hardness of the galvanized layer was measured using a nano-indenter. The friction coefficient was to examine workability, and a P-340N washing oil was applied on the hot-dip galvanized steel sheet, and a sample was rotated at a speed of 200 mm/sec while applying pressure of 5 MPa, and the friction coefficient was indicated by a value obtained by dividing a drawing load applied in the rotation by the applied pressure. A testing device used in the measurement was a high speed and high pressure rotatable continuous friction coefficient measuring device, and a size of the tool was 18×28 mm, and the tool was made of a SKD11 type material and was coated with chromium.

Meanwhile, a cross-sectional surface of the galvanized steel sheet, taken in a thickness direction was observed with respect to inventive example 2 and comparative examples 2 and 7, and results thereof were listed in FIG. 1. A pole figure of a (0001) surface was measured using EBSD with respect to inventive example 2 and comparative examples 2 and 7, and results thereof were listed in FIG. 2. Also, impact peel strengths with respect to inventive examples 1 to 3 and comparative examples 1 to 7 were listed in FIG. 3.

TABLE 1

| Embodiment No. | Mn (wt %) | Galvanized Layer Cooling Rate (° C./s) | Al—Mn Alloy Phase | Area Ration of Al—Mn Alloy Phase (%) | Low-Temperature Impact Peel Strength (N/mm) | Peeling of Galvanized Layer | Hardness Galvanized Layer (Hv) | Friction of Coefficient |
|---|---|---|---|---|---|---|---|---|
| Comparative Example 1 | 0 | −15 | X | 0 | 9.7 | Occurred | 77 | 0.142 |
| Comparative Example 2 | 0 | −30 | X | 0 | 7.2 | Occurred | 76 | 0.135 |
| Comparative Example 3 | 0 | −45 | X | 0 | 2.1 | Occurred | 78 | 0.143 |
| Comparative Example 4 | 0.2 | −15 | O | 18 | 13.7 | Occurred | 93 | 0.125 |
| Inventive Example 1 | 0.2 | −20 | O | 30 | 16.5 | Not Occurred | 89 | 0.125 |
| Inventive Example 2 | 0.2 | −35 | O | 31 | 17.5 | Not Occurred | 88 | 0.127 |
| Inventive Example 3 | 0.2 | −40 | O | 38 | 16.3 | Not Occurred | 90 | 0.116 |
| Comparative Example 5 | 0.2 | −45 | O | 51 | 10.4 | Occurred | 91 | 0.127 |
| Comparative Example 6 | 0.6 | −15 | O | 100 | 7.4 | Occurred | 96 | 0.118 |
| Comparative Example 7 | 0.6 | −30 | O | 100 | 7.9 | Occurred | 98 | 0.116 |

As for comparative examples 1 to 3, the steel sheet was submerged in a galvanizing bath of 460° C., obtained by adding 0.2 wt % of aluminum to a general zinc bath, was cooled to 400° C. by adjusting a speed of cooling the galvanized layer to be −15, −30 and −45° C./s right after an air-knife, and was air-cooled. As indicated in Table 1 and FIG. 3, friction coefficients of comparative examples 1 to 3 were high such that galling properties was deteriorated, impact peel strength was low, 10 N/mm or lower, and a fracture surface was actually formed on the galvanized layers in a peeling sample. As indicated in FIG. 1, an Al—Mn alloy phase was not formed in comparative example 2. Also, a growth direction of the galvanized layer of comparative example 2 was concentrated on the (0001) as indicated in the EBSD result in FIG. 2.

Inventive examples 1 to 3 and comparative examples 4 and 5 were galvanized steel sheets manufactured by adding 0.2 w % of aluminum and 0.2 wt % of manganese to the galvanizing bath to form an Al—Mn alloy phase and adjusting a speed of cooling the galvanized layer. Manganese of the galvanized layer was solid solute in a liquid state, but as solubility decreased during cooling, a portion of manganese was solid solute to the galvanized layer and another portion thereof changed to an Al—Mn alloy phase. The solid solute manganese improved hardness of the galvanized layer by 15% or higher by a solid solution strengthening effect, and a surface friction coefficient measured using a continuous friction coefficient measuring device decreased to 0.116-0.127 such that galling properties was addressed.

As for inventive examples 1 to 3 and comparative examples 4 and 5 including 0.2 wt % of manganese, impact peel strengths (adhesion strength) of all the examples were 10 N/mm or higher, which is excellent, according to results of the impact peel test. However, fracture regions were different depending on the speeds of cooling the galvanized layer.

As for comparative example 4, the cooling was performed at a cooling rate of −15° C./s, and the Al—Mn alloy phase formed on the galvanized layer was formed on an interfacial surface and also in the galvanized layer and on a surface of the galvanized layer such that a ratio of the Al—Mn alloy phase formed on the inhibition layer was low, and accordingly, a growth direction of the galvanizing bath was not randomly oriented. As a result, adhesion strength was 10 N/mm or higher, but an embrittlement fracture mechanism was working as a main fracture mechanism on the (0001) surface at extremely low temperature such that a fracture surface was formed between the galvanized layer and a base iron.

As for inventive examples 1 to 3, the galvanized layer was cooled at a cooling rate of −20° C./s--40° C./s in the galvanizing bath including 0.2 wt % of manganese, and it has been indicated that the formed Al—Mn alloy phase was mainly formed right on the inhibition layer, and a ratio (an area ratio) of the Al—Mn alloy phase occupying the inhibition layer was 30-40%, which is also indicated in FIG. 1.

Figure 2:
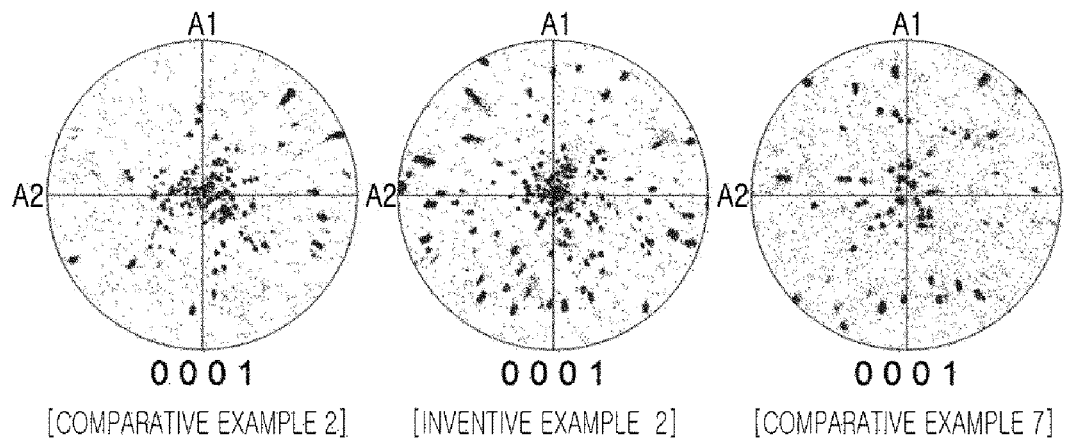
FIG. 2 is a pole figure of a (0001) surface using EBSD with respect to inventive example 2 and comparative examples 2 and 7 of an embodiment.

As in inventive examples 1 to 3, the Al—Mn alloy phase between the galvanized layer and the inhibition layer randomly oriented a growth direction of the galvanized layer such that an effect of preventing embrittlement fracture at row temperature was obtained, which is also indicated in FIG. 2. Also, as the Al—Mn alloy phase did not entirely cover the inhibition layer, adhesive force between the inhibition layer and the zinc layer was secured such that excellent plating adhesion was exhibited at room temperature and also at low temperature. As indicated in the result of the impact peel test in Table 1 and FIG. 3, strengths of inventive examples 1 to 3 were the most excellent, and the peeling of the galvanized layer did not occur. Having observed a fracture part of the peeled samples of inventive examples 1 to 3, it has been observed that an adhesive portion for fastening the two samples was fractured, and the peeling did not occur on an interfacial surface between the galvanized layer and the base iron or in the galvanized layer.

As for comparative example 5, the galvanized layer was rapidly cooled at a cooling rate of −45° C./s, and in such rapid cooling, a size of spangle was fine, 30-50 micrometers or less. As a zinc spangle particle is finely formed, a possibility of the zinc spangle particle being in contact with an Mn alloy phase formed on the inhibition layer decreased such that the randomly oriented (0001) surface was reduced, and a vertically oriented (0001) surface increased. Also, vertical growth driving force of the (0001) surface was strongly applied due to the rapid cooling such that even the galvanizing bath containing Mn may have deteriorated embrittlement fracture. As a result of the impact peel test (adhesive force test), adhesive strength was 10 N/mm or higher, but the peeling occurred between the base iron and the galvanized layer due to embrittlement fracture.

Comparative examples 6 and 7 are results of the test in which a content of Mn was increased to 0.6 wt %, and cooling rates were −15 and −30° C./s, respectively. Due to a high ratio of Mn in the galvanized layer, the Mn alloy phase between the inhibition layer and the galvanized layer was continuously formed on the inhibition layer as shown in FIG. 1, an image of a cross-sectional surface of the galvanized layer of comparative example 7 in the thickness direction, and although a growth direction of the galvanized layer was randomly arranged, a contact area between the inhibition layer and the galvanized layer was small such that overall adhesive force was deteriorated as indicated in the EBSD result in FIG. 2. The above results may lead to the result in which the fracture part occurred on a boundary between the galvanized layer and the base iron in the impact peel test.

Figure 3:
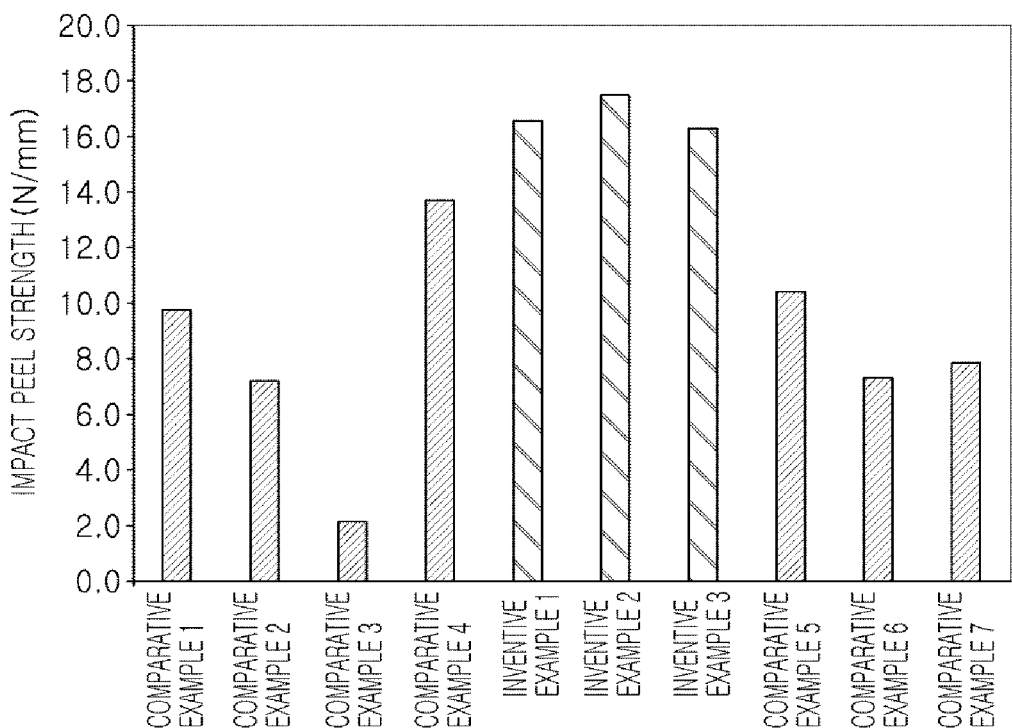
FIG. 3 is a graph showing impact peel strength with respect to inventive examples 1 to 3 and comparative examples 1 to 7 of an embodiment.

As described above, inventive examples 1 to 3 conformed to the present invention had the most excellent impact peel strength such that low-temperature adhesion was excellent as indicated in FIG. 3, the peeling of the galvanized layer did not occur as indicated in Table 1, and inventive examples 1 to 3 had low friction coefficients such that inventive examples 1 to 3 had characteristics of the galvanized steel sheet having excellent workability.

The invention claimed is:

1. A hot-dip galvanized steel sheet having excellent low-temperature adhesion and workability, the hot-dip galvanized steel sheet comprising:
    an inhibition layer comprising an Fe—Al based intermetallic alloy phase formed on a base steel sheet; a hot-dip galvanized layer formed on the inhibition layer; and an Al—Mn based alloy phase discontinuously formed between the inhibition layer and the hot-dip galvanized layer,
    wherein an area ratio of the Al—Mn based alloy phase is 20-40% of a surface of the inhibition layer.

2. The hot-dip galvanized steel sheet of claim 1, wherein hardness of the hot-dip galvanized layer is 85 Hv or higher.

3. The hot-dip galvanized steel sheet of claim 1, wherein a thickness of the inhibition layer is 1 μm or less.

4. The hot-dip galvanized steel sheet of claim 1, wherein a thickness of the hot-dip galvanized layer is 2-60 μm.

5. A hot-dip galvanized steel sheet having excellent low-temperature adhesion and workability, the hot-dip galvanized steel sheet comprising:
    an inhibition layer comprising an Fe—Al based intermetallic alloy phase formed on a base steel sheet; a hot-dip galvanized layer formed on the inhibition layer; and an Al—Mn based alloy phase discontinuously formed between the inhibition layer and the hot-dip galvanized layer,
    wherein a thickness of the inhibition layer is 1 μm or less.

6. The hot-dip galvanized steel sheet of claim 5, wherein a thickness of the hot-dip galvanized layer is 2-60 μm.

7. The hot-dip galvanized steel sheet of claim 5, wherein an area ratio of the Al—Mn based alloy phase is 50% or less (excluding 0%) of a surface of the inhibition layer.

8. The hot-dip galvanized steel sheet of claim 5, wherein hardness of the hot-dip galvanized layer is 85 Hv or higher.

* * * * *